(12) United States Patent
Witman et al.

(10) Patent No.: US 12,084,186 B1
(45) Date of Patent: Sep. 10, 2024

(54) DRONE LOAD RELEASE SYSTEM

(71) Applicant: SURVICE Engineering Company, LLC, Belcamp, MD (US)

(72) Inventors: Joel Henry Witman, Essex, MD (US); Mark Thomas Butkiewicz, North East, MD (US); Robert Eric Baltrusch, Oxford, PA (US)

(73) Assignee: SURVICE Engineering Company, LLC, Belcamp, MD (US)

( * ) Notice: Subject to any disclaimer, the term of this patent is extended or adjusted under 35 U.S.C. 154(b) by 194 days.

(21) Appl. No.: 17/897,707

(22) Filed: Aug. 29, 2022

(51) Int. Cl.
   *B64D 1/12*   (2006.01)
   *B64U 101/69*   (2023.01)

(52) U.S. Cl.
   CPC ............ *B64D 1/12* (2013.01); *B64U 2101/69* (2023.01)

(58) Field of Classification Search
   CPC ... B64D 1/02; B64D 1/08; B64D 1/10; B64D 1/12; B66C 1/101; B64U 2101/64; B64U 2101/69
   USPC .................................. 410/77; 248/317, 682
   See application file for complete search history.

(56) References Cited

U.S. PATENT DOCUMENTS

| | | | | |
|---|---|---|---|---|
| 2,665,163 | A * | 1/1954 | Gross | B64D 17/383 30/DIG. 4 |
| 4,651,957 | A * | 3/1987 | Minnich, II | B64D 1/08 244/137.3 |
| 5,494,386 | A * | 2/1996 | Paull | A61G 1/06 410/3 |
| 6,488,457 | B2 * | 12/2002 | Diamante | B64D 11/0696 410/84 |
| 9,056,678 | B2 * | 6/2015 | Forsans | B64D 17/56 |
| 9,688,404 | B1 * | 6/2017 | Buchmueller | B64D 1/22 |
| 9,725,168 | B2 * | 8/2017 | Kim | B64U 60/50 |
| 10,040,370 | B2 * | 8/2018 | Wei | H01M 10/058 |
| 10,207,805 | B2 * | 2/2019 | Evans | G06Q 10/02 |
| 10,435,156 | B2 * | 10/2019 | Bellof | B64D 9/00 |
| 10,538,331 | B2 * | 1/2020 | Taylor | B64D 1/06 |
| 10,933,995 | B2 * | 3/2021 | Halevy | B64D 1/22 |
| 11,345,051 | B2 * | 5/2022 | Zheng | B64D 9/00 |
| 11,414,002 | B2 * | 8/2022 | Georgeson | B64C 39/024 |
| 11,667,389 | B2 * | 6/2023 | Coe | B64D 17/34 244/147 |

(Continued)

FOREIGN PATENT DOCUMENTS

| | | | |
|---|---|---|---|
| CN | 113799986 A | * | 12/2021 |
| CN | 114013657 A | * | 2/2022 |
| KR | 102006171 B1 | * | 8/2019 |

*Primary Examiner* — Magdalena Topolski
(74) *Attorney, Agent, or Firm* — Peter Loffler

(57) ABSTRACT

A drop kit that attaches to a pair of parallel picatinny rails one drone uses a pair of drop mechanisms that hold one side of a load bearing basket. The opposing side of the basket is pivotally secured to a goggle plate. Each drop mechanism is attached to one of the rails and the goggle plate to both of the rails via a spring-loaded centering clamp system. The drop mechanisms use a drop cam that rotates between and open and closed position so that when the drone arrives at a desired spot, a signal is provided to a pair of motors, each motor associated with one of the drop mechanisms, in order to rotate the drop cam into its open position, releasing its side of the basket with the opposing side of the basket pivoting and then falling free of the goggle plate.

22 Claims, 12 Drawing Sheets

(56) References Cited

U.S. PATENT DOCUMENTS

| | | | |
|---|---|---|---|
| 11,767,122 B2 * | 9/2023 | Coe | B64D 17/34 |
| | | | 244/142 |
| 11,794,931 B2 * | 10/2023 | Gil | B64D 1/10 |
| 11,802,023 B2 * | 10/2023 | Hafenrichter | B64D 1/22 |
| 2015/0037124 A1 * | 2/2015 | Longagna | B65D 88/56 |
| | | | 414/425 |
| 2019/0061944 A1 * | 2/2019 | Zvara | B64D 1/08 |
| 2019/0135437 A1 | 5/2019 | Halevy | |
| 2020/0123815 A1 | 4/2020 | Fox, Jr. | |
| 2021/0163137 A1 * | 6/2021 | Lachevre | G05G 5/005 |
| 2021/0309367 A1 * | 10/2021 | Smee | B64C 39/024 |

* cited by examiner

DRONE LOAD RELEASE SYSTEM

GOVERNMENT INTERESTS

This invention was made with Government support under Other Transaction Agreement Number W15QKN-14-9-1001 awarded by the United States Army Contracting Command-New Jersey (ACC-NJ). The Government has certain rights in the invention.

BACKGROUND OF THE INVENTION

1. Field of the Invention

The present invention relates to a system that carries a load onboard a drone and releases the load upon command, either preplanned so as to be autonomous or on demand, without the need to land the drone.

2. Background of the Prior Art

Drones have moved from simple kids' toys that fly around the backyard taking pictures to become sophisticated task-oriented machines that often cover great distances in their assigned duties. Drones perform all kinds of jobs such as checking the integrity of high-tension electrical transmission wires, painting buildings, spraying crops with pesticide, and conducting combat missions, among many other tasks. One task that modern drones perform is ferrying goods from a supply point to a drop point. The drone is loaded with the supplies, typically attached in some fashion to the underside of the drone and thereafter, the drone flies to the drop point, either autonomously or under human guidance. At the termination point, the drone lands, the load is detached from the drone, and the drone flies back to its origination point or some other point as the user sees appropriate. Even relatively small drones now have sufficient lift capability and battery power to be able to fly sufficiently heavy loads a relatively far distance. Such loads run the gamut of supplies from water and food to people working at a remote location, to ammunition and other combat supplies to a soldier in the field, such as a forward air controller.

While such ferrying of goods is extremely useful in many situations, the method can be improved. Currently, the drone must land (or at least hover near ground level if safe to do so) and its load manually off-loaded by a person. While often not problematic, this procedure can be limiting. If no one is present at the delivery site, as may be caused, for example, by a soldier awaiting a resupply needing to attend to another task such as avoiding an enemy patrol, the delivery must either be aborted or the drone must land and await the return of the person, preventing the drone from commencing its next mission. Additionally, a termination point might not provide for a suitable landing spot for the drone, such as a drone attempting a delivery to a person deep in a forest populated by very tall long needle pines.

What is needed is a system that permits a drone to ferry supplies to a remote site and be able to drop the load off at the destination without the need to land and without the need for a person to assist in offloading the supplies. Such a system must be relatively simple in design and operation.

SUMMARY OF THE INVENTION

The drone load release system of the present invention addresses the aforementioned needs in the art by providing a system that is attached to a drone and to which a load is attached. When the drone reaches a designated spot, the load is released without the need to land the drone and without the need for a person to assist in offloading the drone, the load is simply gravitationally offloaded and awaits usage by the person(s) on the ground. The drone load release system is of relatively simple design and construction and is relatively easy to operate both at the commencement point and the termination point.

The drone load release system of the present invention is comprised of a plate that has a first relief. The plate is attached to the picatinny rail of the drone. A payload release system is attached to the picatinny rail of the drone in spaced apart fashion from the plate. The payload release system has a housing that has a drop cam rotatably attached thereto. The drop cam has a receiver mouth and is rotatable between a normally open position wherein the receiver mouth is facing away from the picatinny rail and a closed position wherein the receiver mouth is facing generally toward the picatinny rail. A receptacle has a base, a first end plate with a second relief and an opposing second end plate with a tab. The tab is received within the first relief and the receiver mouth receives the second relief such that whenever the receiver mouth is in the closed position, the receptacle is secured to the picatinny rail with the first end plate of the receptacle held within the receiver mouth and the tab of the second end plate held within first relief. When the receiver mouth is in the open position, the first end plate gravitationally falls out of the receiver mouth of the payload release system and the tab gravitationally slides out of the first relief whenever the picatinny rail is facing a ground surface. The first end plate and the second end plate of the receptacle are joined by a first side plate and an opposing second side plate. The base, the first end plate, the second end plate, the first side plate and the second side plate are all in the form of a lattice. A lever is rotatably attached to the housing wherein the lever is rotatable between a hold position wherein the lever biases against the drop cam whenever the drop cam is in the closed position thereby preventing the drop cam from rotating to the open position, and a release position wherein the lever is disengaged from the drop cam allowing the drop cam to rotate to the open position. The lever spring-loaded under the bias of a spring. A servo cam rotates between an engaged position wherein the servo cam presses against the lever, under the bias of the spring, in order to hold the lever in the hold position and a disengaged position wherein the lever, rotates to the release position. The servo cam is rotated by a servo motor held within the housing. The servo motor receives an operation signal to rotate the servo cam via a wireless signal or the servo motor receives an operation signal to rotate the servo cam via a preprogrammed instruction set input into a control module in communication with the servo motor. The plate is attached to the picatinny rail via a first variable width clamp that engages the picatinny rail and the payload release system is attached to the picatinny rail by a second variable width clamp that is adapted to engage the picatinny rail. The first variable width clamp and the second variable width clamp are each spring-loaded.

BRIEF DESCRIPTION OF THE DRAWINGS

Similar reference numerals refer to similar parts throughout the several views of the drawings.

DESCRIPTION OF THE PREFERRED EMBODIMENT

Figure 1:
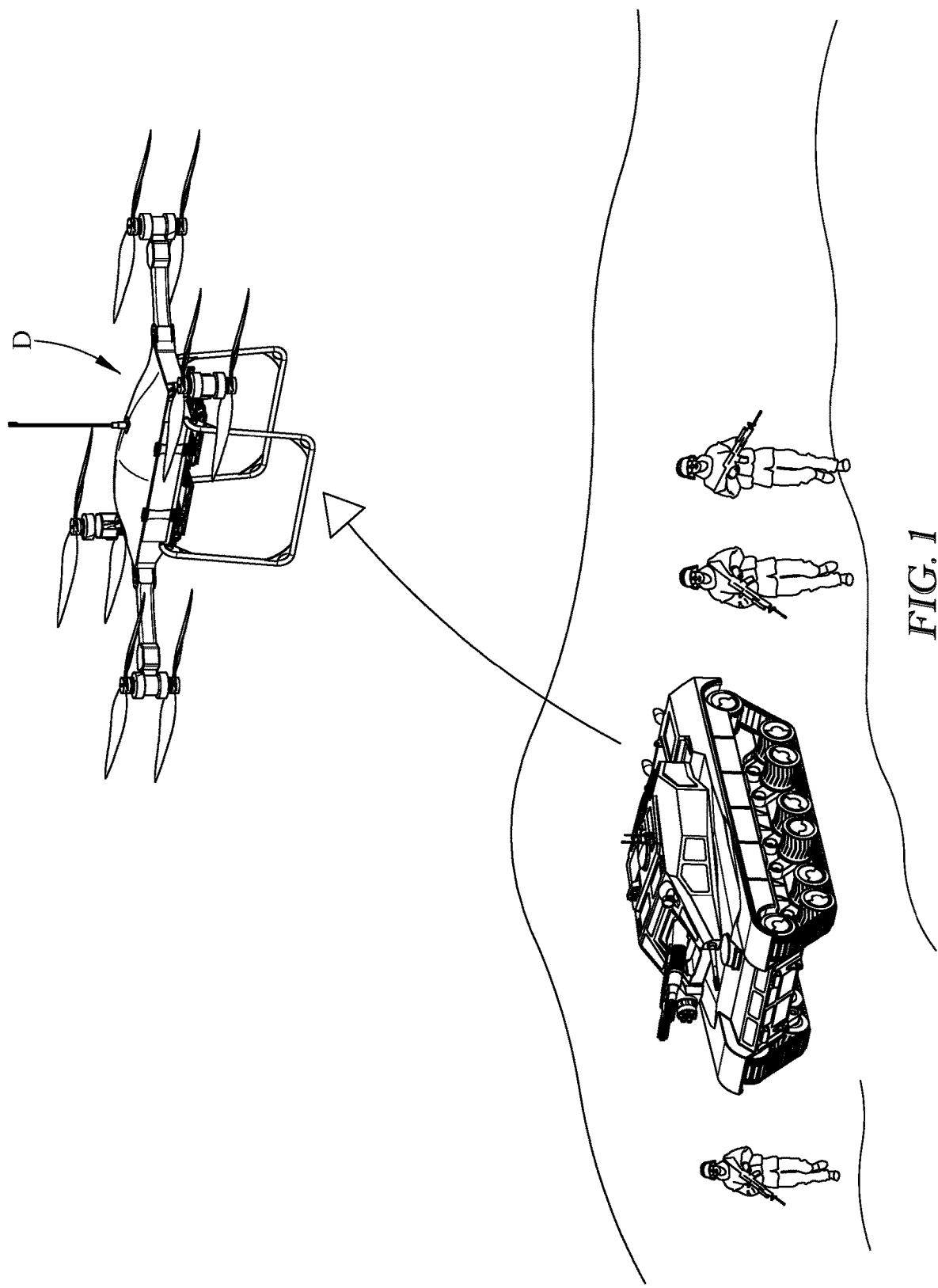
FIG. 1 is an environmental view of the drone load release system of the present invention ferrying a load.
Figure 2:
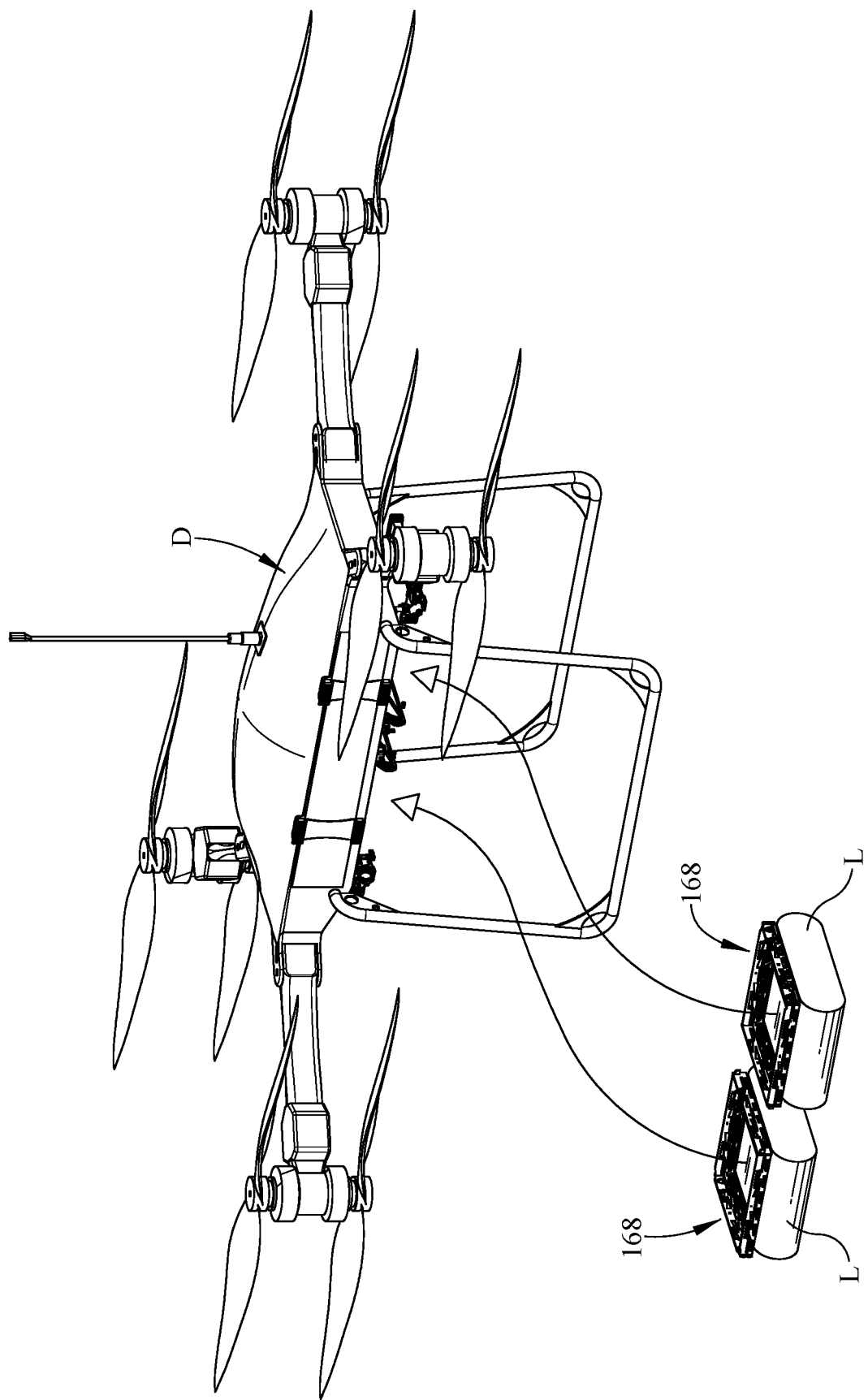
FIG. 2 is an environmental view of the drone load release system positioned on a drone about to be loaded with cargo.
Figure 3:
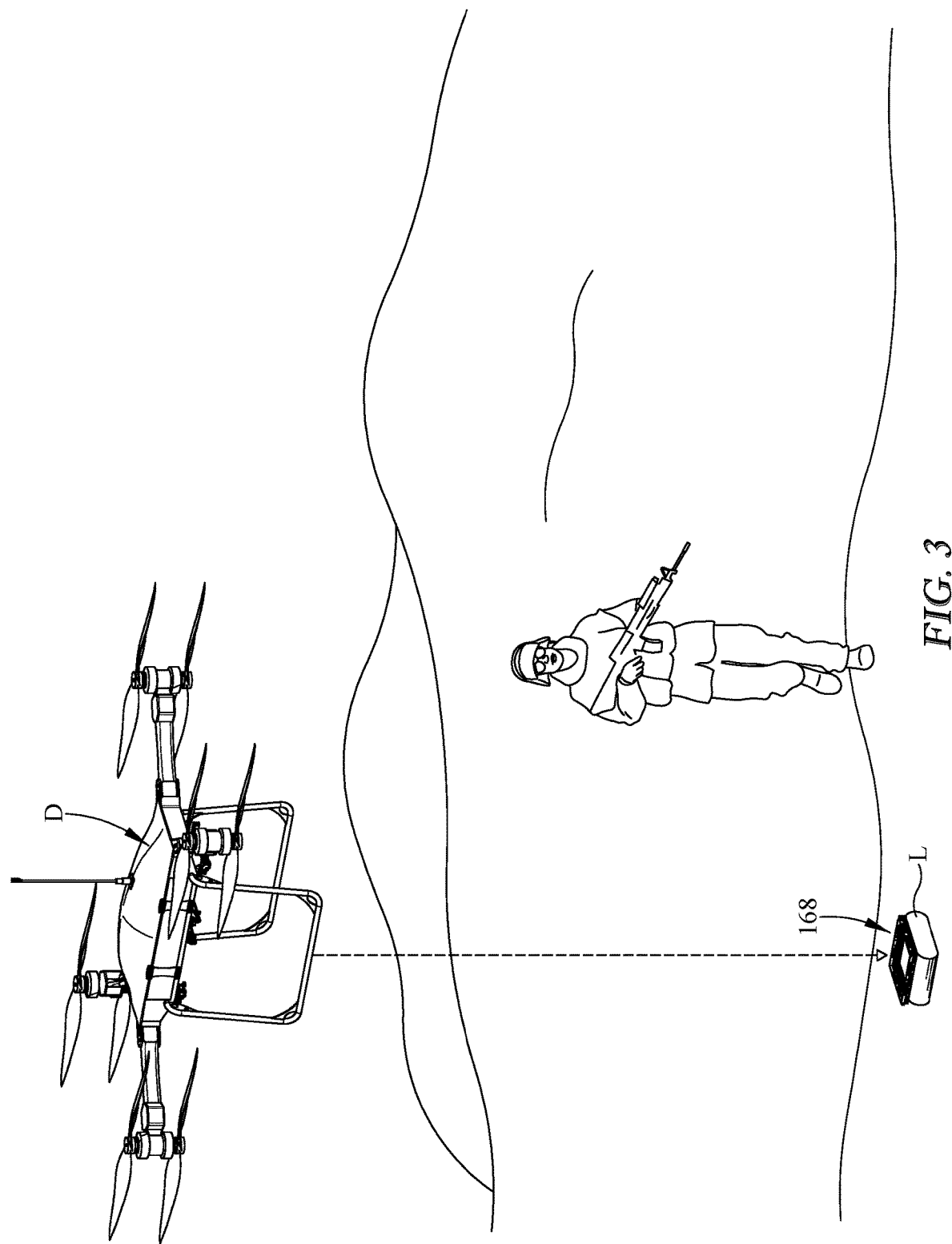
FIG. 3 is an environmental view of the drone load release system positioned on a drone delivering its cargo.
Figure 4:
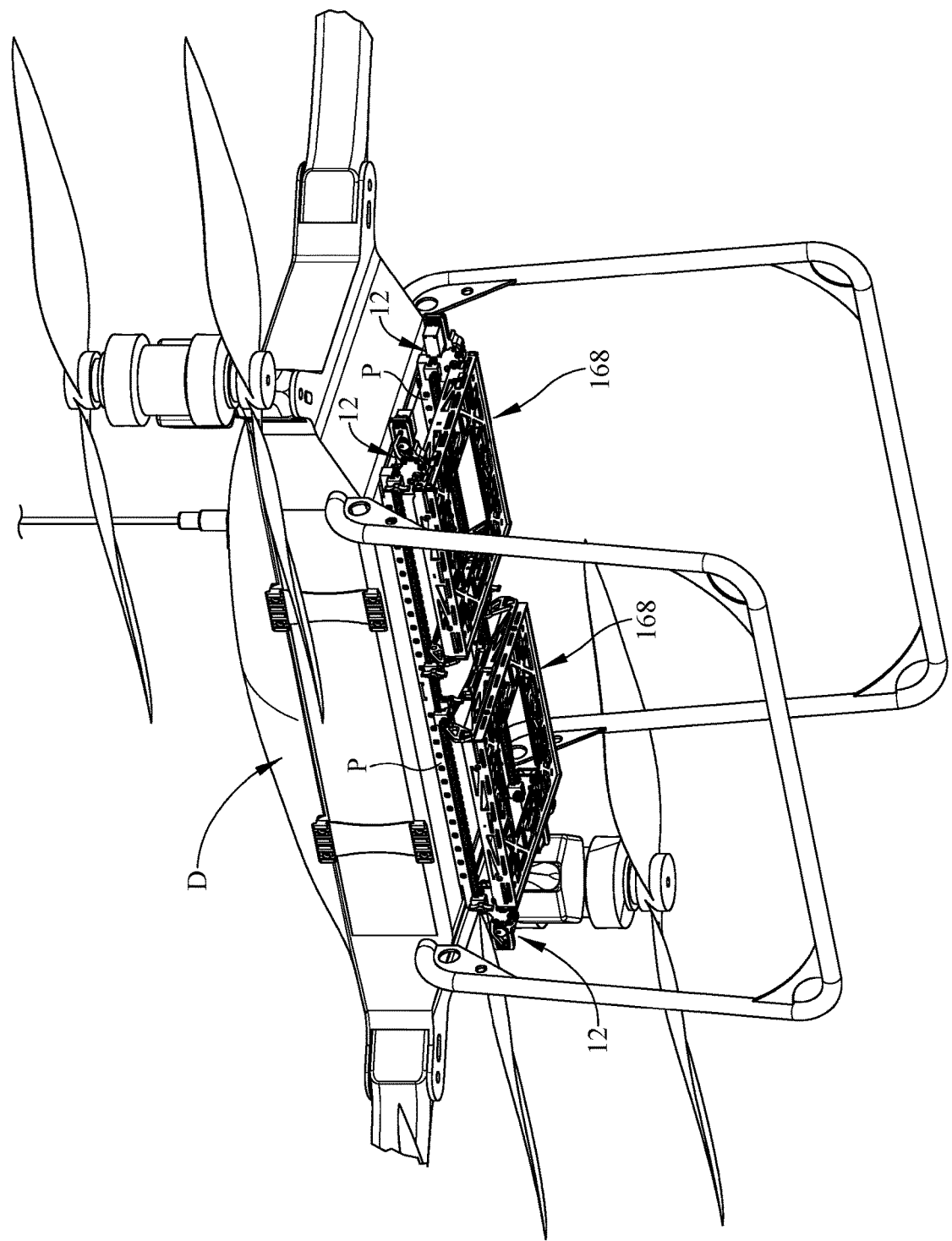
FIG. 4 is a perspective view of a pair of drone load release systems positioned on a drone.

Referring now to the drawings, it is seen that the drone load release system of the present invention, generally denoted by reference numeral 10, is comprised of three main interworking systems, namely the payload release system 12, the payload attachment system 14, and the center locating bracket assembly 16.

As seen, the payload release system 12 comprises a servo motor 18 that has an output shaft 20 that is rotatably responsive to the motor's operation. Located at the end of the shaft 20 is a servo cam 22, the servo cam 22 affixed to the shaft 20 in any appropriate manner such via the illustrated screw 24 and washer 26. A release mechanism housing is attached to a flange 28 located on the motor's housing. The release mechanism housing comprises an inner plate 30 and an outer plate 32 with a spacer plate 34 and a donut spacer 36 sandwiched therebetween in order to create a working space for the release mechanism proper. Rotatably disposed between the inner plate 30 and the outer plate 32 is a drop cam 38 that has a cam pad mouth 40 which receives drop cam pad 42 which acts as a low friction contact surface for the release lever discussed more fully below. The drop cam 38 also has a receiver mouth 44 located opposite the cam pad mouth 40. The drop cam 38 is rotatably disposed between the inner plate 30 and outer plate 32 via a cam bushing 46 that is received within a cam opening 48 on the drop cam 38, such that an axle bolt 50 passes through an opening 52 on the outer plate 32, through the central opening of the cam bushing 46, and through an opening 54 on the inner plate 30 as well as through a pair of washers 56 that are located on either side of the drop cam 38. An appropriate nut 58 is threadably secured to the end of the axle bolt 52.

A release lever 60 is also rotatably disposed between the inner plate 30 and the outer plate 32, the release lever 60 having a nose 62, a bent arm 64, and a lever opening 66. The release lever 60 is rotatably disposed between the inner plate 30 and outer plate 32 via a lever bushing 68 that is received within the lever opening 66 on the release lever 60 such that another axle bolt 70 passes through an opening 72 on the outer plate 32, through the central opening of the lever bushing 68, and through an opening 74 on the inner plate 30. An appropriate nut 76 is threadably secured to the end of the axle bolt 70.

A spacer frame 78 is disposed between the inner plate 30 and the outer plate 32 and held thereat by passing a bolt 80 through an opening 82 on the outer plate, through an opening 84 on the spacer frame 78 and through an opening 86 on the inner plate 30 such that an appropriate nut 88 is threadably secured to the end of the bolt 80. As seen, the spacer frame 78 has a rounded spring seat 90 with a spring opening 92.

A spring assembly 96 comprises a J-shaped spring cam 98 having a rounded outer surface 100 and a mouth 102 such that a torsion spring 104 is seated within the mouth 102. The spring assembly 96 is seated within the spring seat 90 of the spacer frame 78 such that the rounded outer surface 100 of the spring cam 98 sits within the spring seat 90 so as to allow the spring cam 98 to rotate within the spring seat 90. One end of the torsion spring 104 is inserted into the spring opening 92 within the spring seat 90 while the opposing end of the spring 104 is retained within a groove on the back side of spring cam 98. The spring cam 98 is rotatably disposed between the inner plate 30 and outer plate 32 (as well as within the spring seat 90 as mentioned) by passing another axle bolt 106 through an opening 108 on the outer plate 32, through the central opening of the spring 104, and through an opening 110 on the inner plate 30. An appropriate nut 112 is threadably secured to the end of the axle bolt 70.

A portion of the center locating bracket assembly 16, namely a pair of the clamps 114, is attached to the payload release system 12. As seen, each clamp 114 has an interchangeable center section 116 with a center section opening 118. One clamp tooth 120 is located on one side of the center section 116 while another clamp tooth 120 is located on the opposing side of the center section 116. Each clamp tooth 120 has a clamp tooth opening 122 and a jaw 124, the jaw having a profile that matches the profile of a picatinny rail P, the picatinny rail being a standard picatinny rail configuration (mil standard for military applications, such as MIL-STD-1913) and may be prewired for power and communications with the motor 18 as more fully discussed below. A threaded helical insert 126 is disposed within one of the clamp tooth openings 122. A spring 128 is located between each clamp tooth 120 and the center section 116. A drive screw 130 has a turn knob 132 that itself has a washer 134 abutting it, passes through, in turn, a clamp tooth opening 122 of one clamp tooth 120, through one of the springs 128, through the center section opening 118 of the center section 116, through the other spring 128, and through the threaded helical insert 126 with an appropriate nut 136 secured to the end of the drive screw 130.

When this payload release system 12 is assembled, the inner plate 30 and the outer plate 32 are held together by passing appropriate bolts 138 through openings 140 on the outer plate 32 and corresponding openings 142 on the inner plate 30 with appropriate nuts 144 threadably secured to the end of each bolt 138. Two of the bolts 138' also pass-through openings 140' located on the center section 116 of the center locating bracket assembly 16 in order to sandwich the center locating bracket assembly 16 between the outer plate 32 and the inner plate 30. The entire assembly is secured to the motor 18 by passing appropriate bolts 146 through openings 148 on the spacer 36, through corresponding openings 150 on the inner plate 30 and through corresponding openings 152 on the flange 28. Appropriate nuts 154 threadably secured to the end of each bolt 146.

Figure 5:
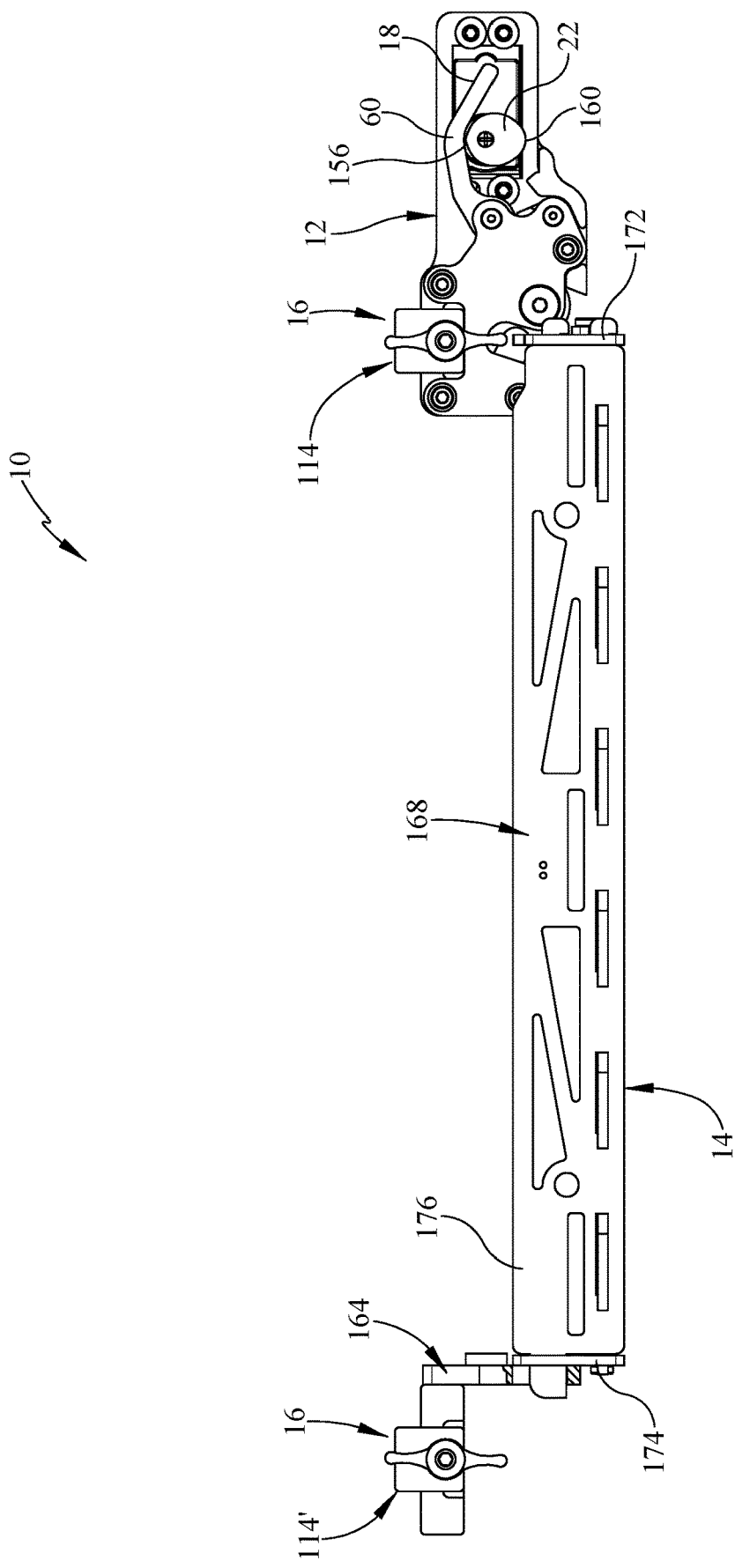
FIG. 5 is an elevation view of the drone load release system in a secured position.
Figure 6:
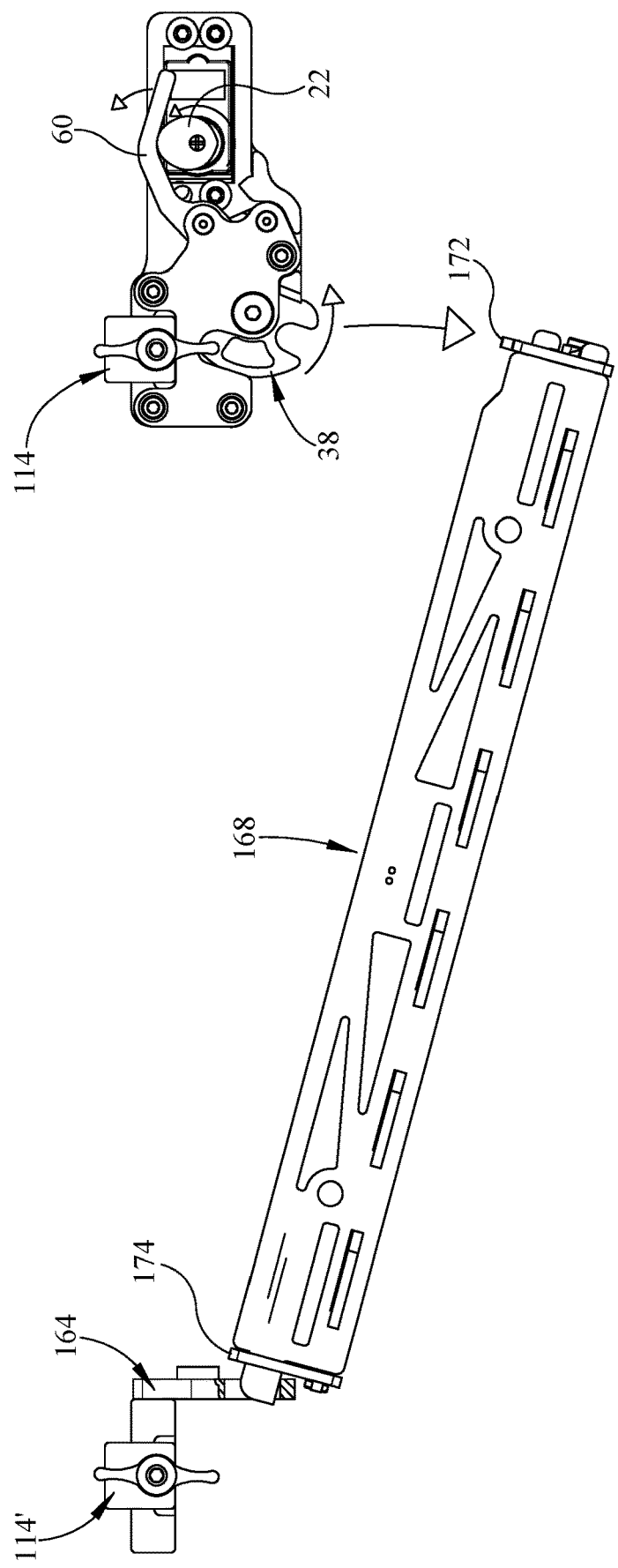
FIG. 6 is an elevation view of the drone load release system in a release position.
Figure 7:
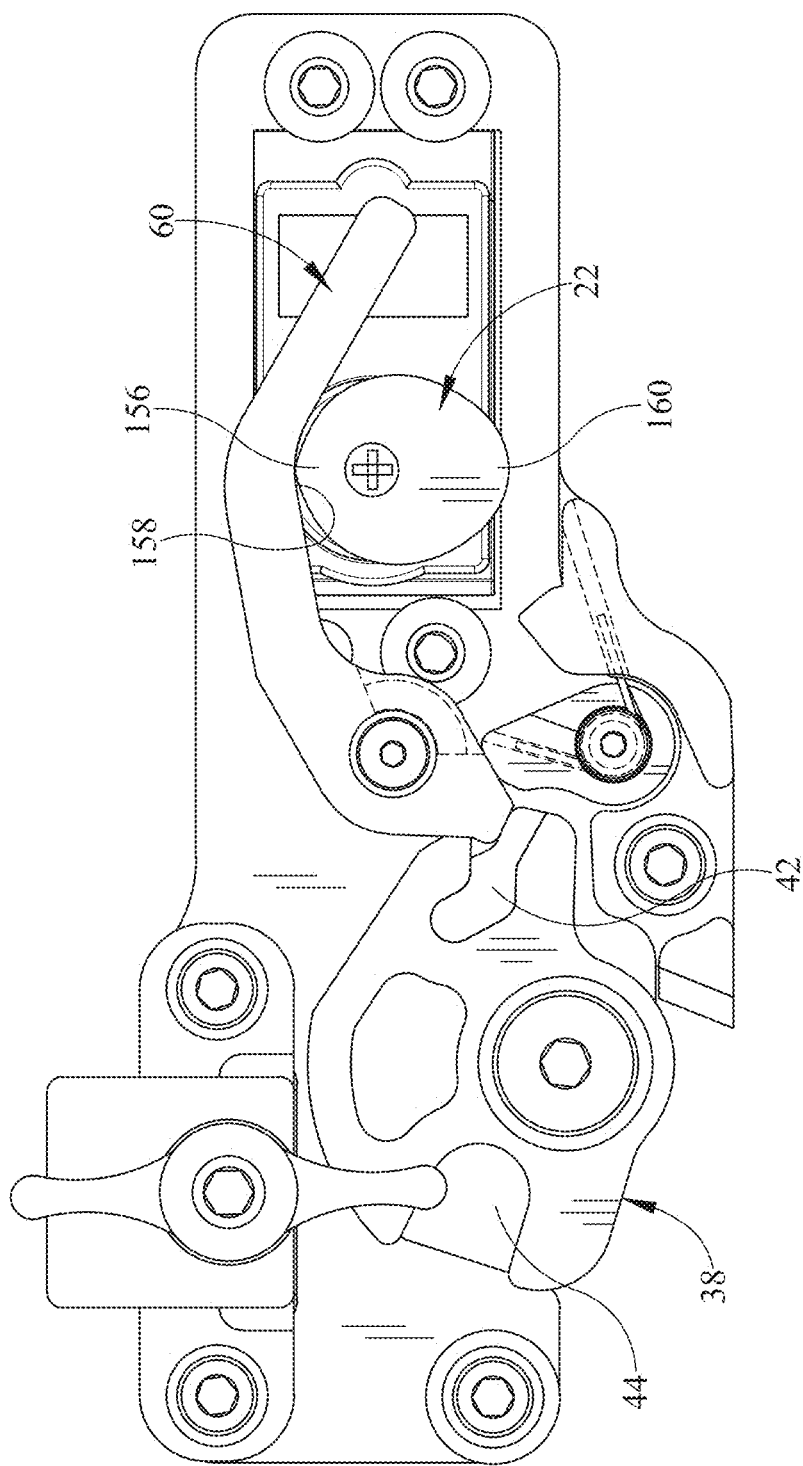
FIG. 7 is an elevation view of the drone load release system in the secured position with the outer plate removed in order to illustrate the inner assembly.
Figure 8:
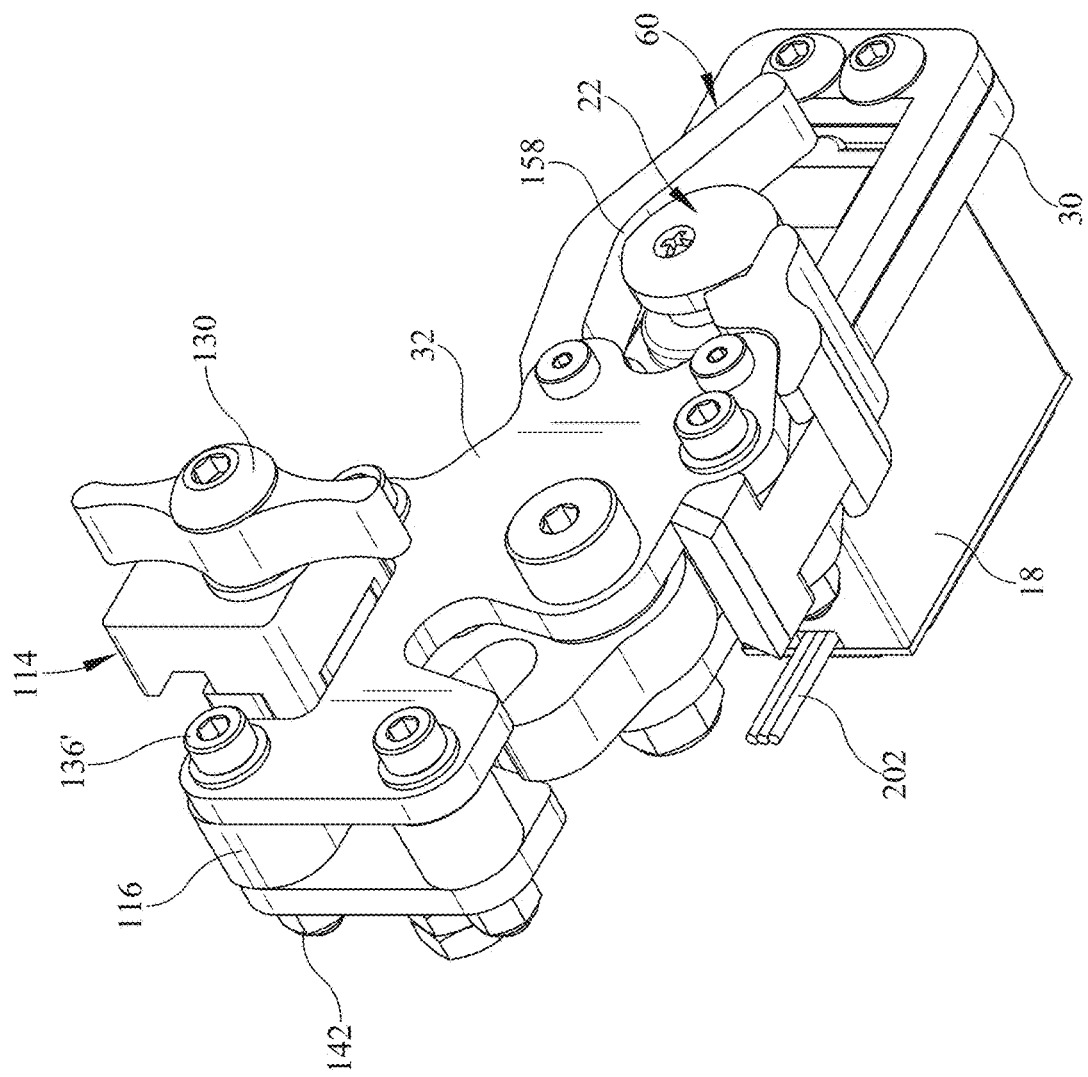
FIG. 8 is a lower perspective view of the drone load release system in the locked position.
Figure 9:
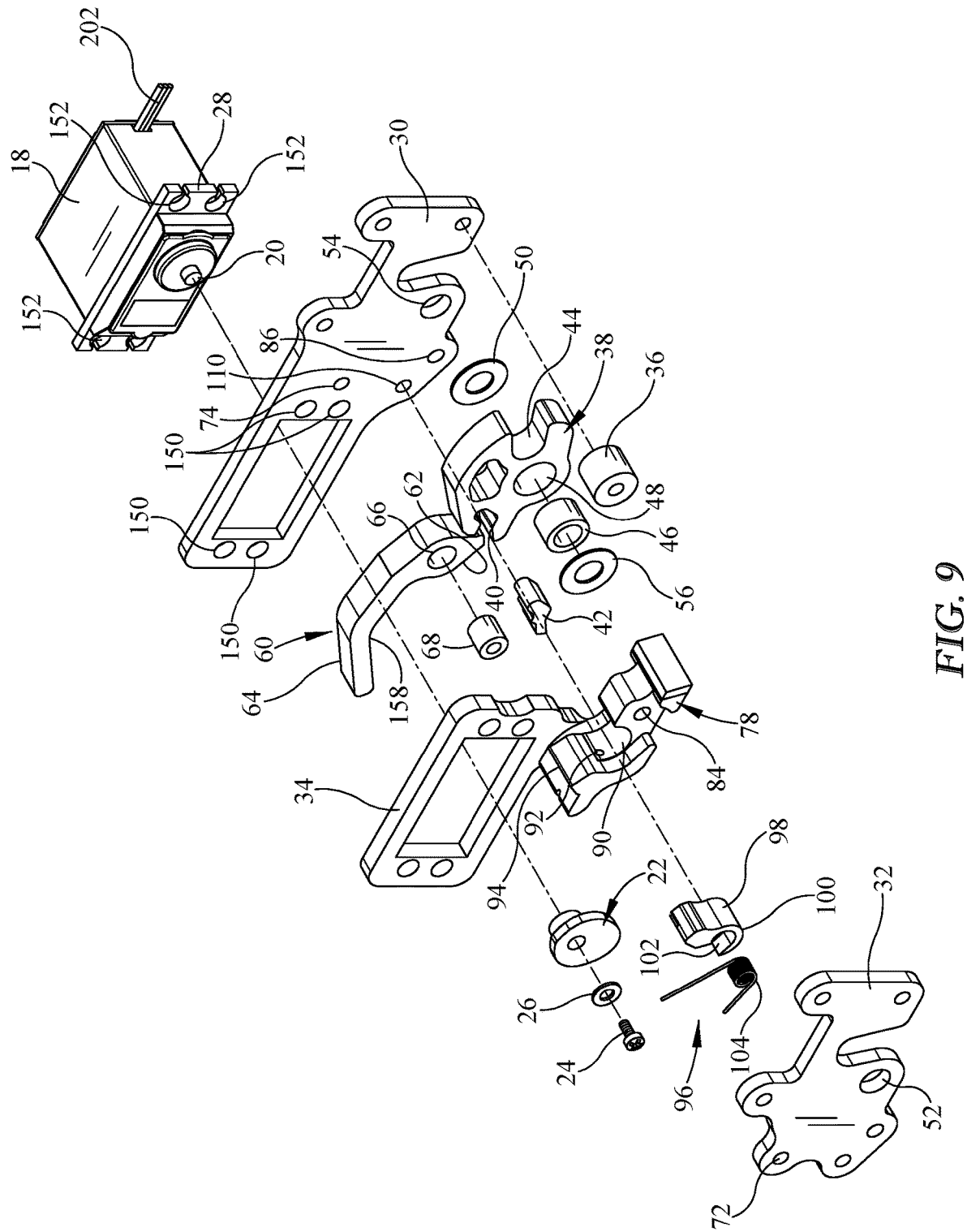
FIG. 9 is an exploded view of the drop mechanism of the drone load release system.
Figure 10:
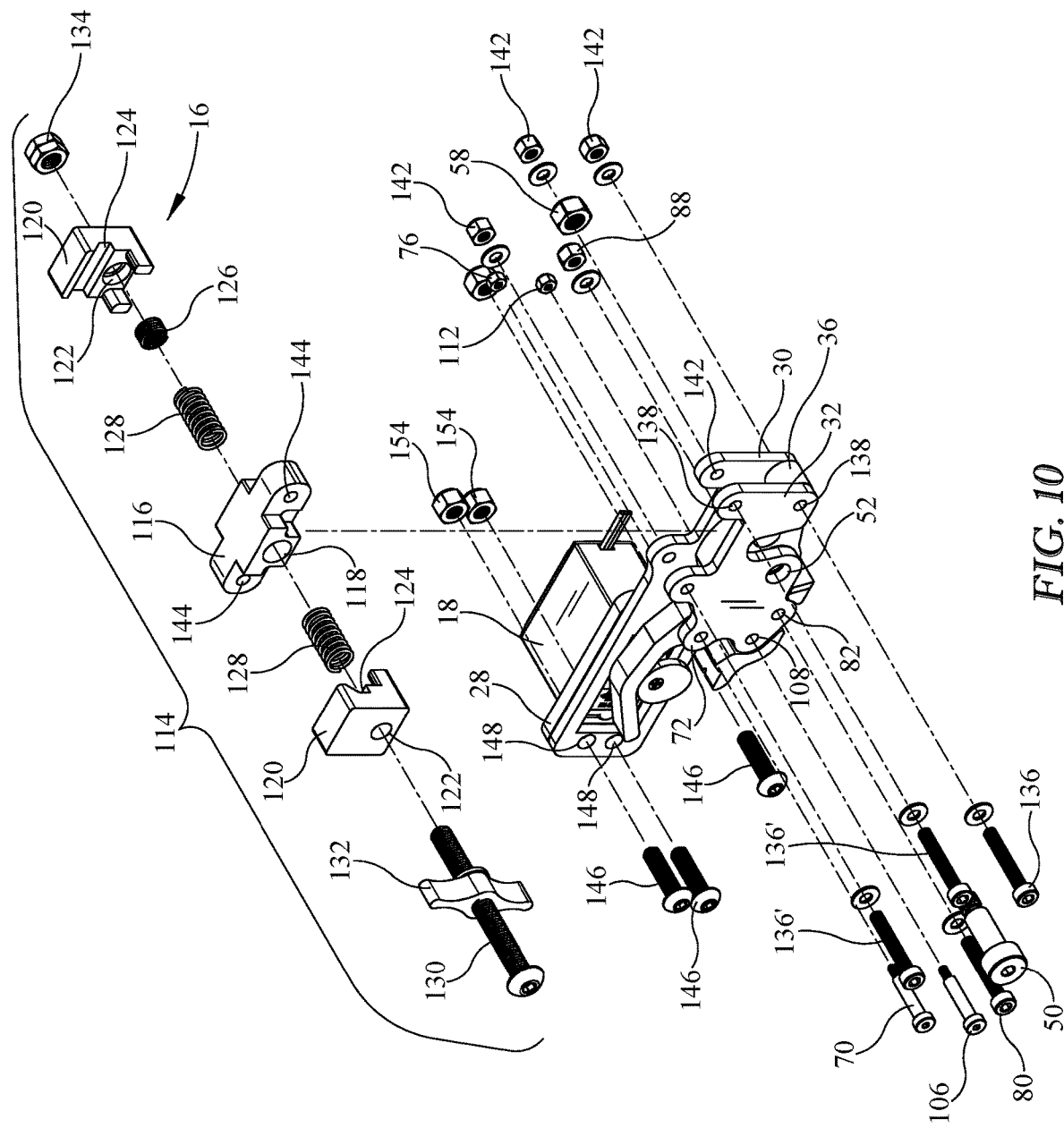
FIG. 10 is a partially exploded view of the picatinny rail attachment system used to attached the drop mechanism to the picatinny rail.
Figure 11:
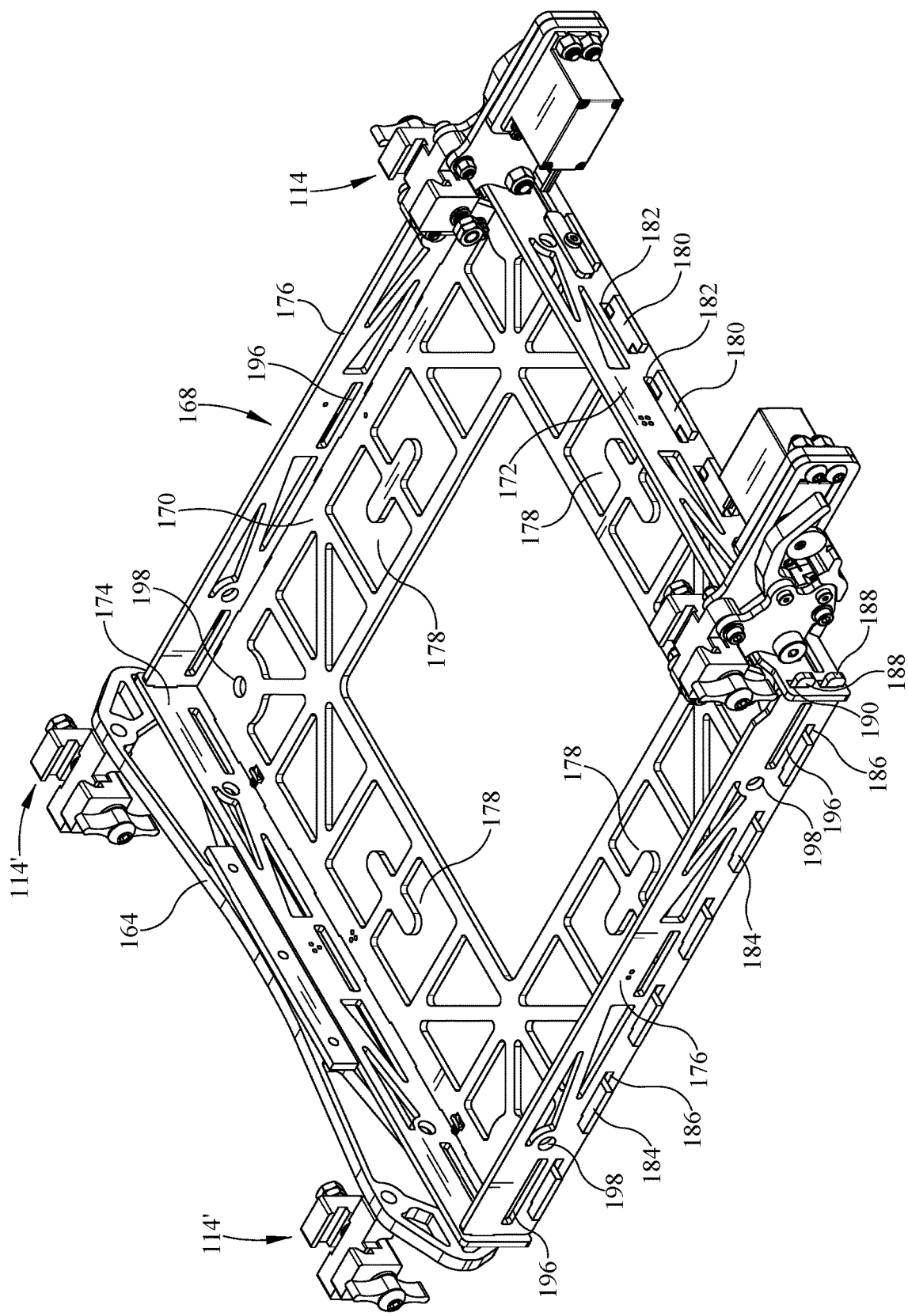
FIG. 11 is a perspective view of the payload release system.
Figure 12:
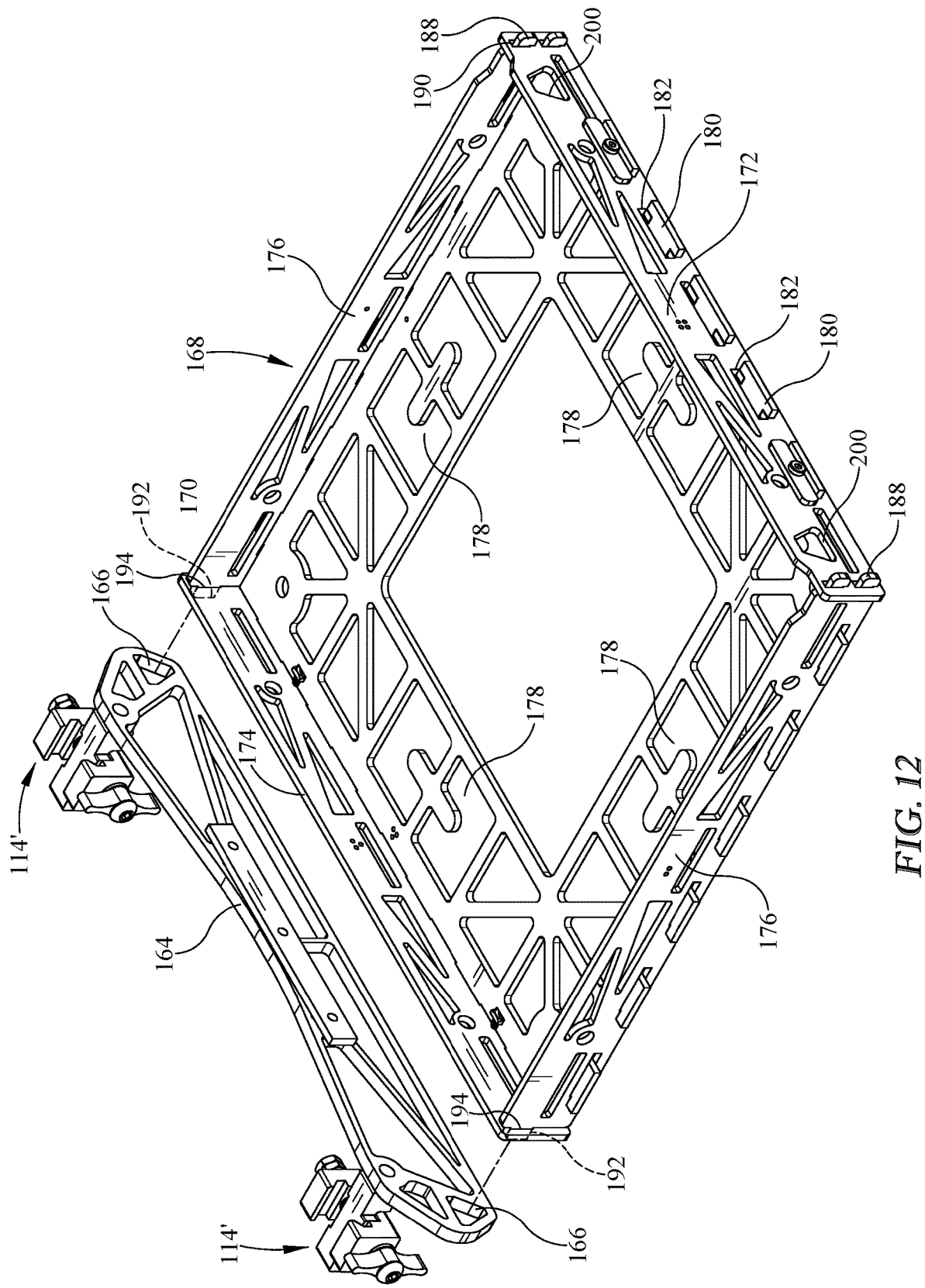
FIG. 12 is a perspective view, partially exploded, of the payload release system with the payload release system removed for clarity.

With particular attention to FIGS. 5, 7 and 8, with the payload release system in the assembled position, the drop cam 38 is positioned such that the opening to its receiver mouth 44 is covered by the inner plate 30 and the outer plate 32, that is, the receiver mouth 44 cannot be accessed through its open end as the open end is covered. The nose 62 of the release lever 60 presses downwardly onto the drop cam pad 42 such that the torsion spring 104 of the spring assembly 96 biases the spring cam 98 against the lower surface of the nose 62 of the release lever 60 in order to press the release lever 60 onto the drop cam pad 42 so as to hold the drop cam 38 is held in this closed position. As also seen, the servo cam 22 is positioned such that its heel 156 is seated within the lower elbow 158 of the release lever 60. When the servo cam 22 rotates, in response to output of the motor 18—counter-clockwise in the figures—the nose 160 of the servo cam 22 initially engages the distal end of the arm 64 of the release lever 60 and continues advancing toward the lower elbow 158 of the release lever 60 until the nose 160 of servo cam 22 is seated within the lower elbow 158 of the release lever 60. This pushes the arm 64 upwardly thereby rotating the nose 62 of the release lever 60 away from the drop cam pad 42, the release lever 60 working against the bias of the spring assembly 96. With sufficient release lever 60 travel, the nose 62 of the release lever 60 no longer presses against the drop cam pad 42, thereby allowing the drop cam 38 to rotate so that the opening of the receiver mouth 44 of the drop cam 38 is no longer covered by the inner plate 30 and the outer plate 32 so that access to the receiver mouth 44 through its open end is possible. The drop cam 38 is in an open position. In order to return the drop cam 38 back to its closed position, the servo cam 22 is rotated 180 degrees so that its heel 156 is seated within the lower elbow 158 of the release lever 60. The drop cam 38 is manually rotated back to the closed position which causes the nose 62 of the release lever 60 to once again be pressed onto the drop cam pad 42 and biased thereonto by the spring assembly 96, the release lever 60 being momentarily snapped out of the way as the drop cam 38 is rotated to its closed position—this rotation back to the closed position, which need not have the benefit of motor operation, is typically accomplished via payload loading as more fully described below. It is noted that the drop cam 38 can be manually released into its open position without the use of the servo motor 18 by simply pushing upwardly on the distal end of the arm 64 of the release lever 60.

Advantageously, the components that slide with respect to each other, at least the servo cam 22, drop cam pad 42, and the release lever 60, are made from a relatively low friction material such as oil impregnated nylon or similar material. The remaining components can be made from a similar material or other appropriate materials, such as plastic, lightweight aluminum, etc.

The remainder of the center locating bracket assembly 16 is comprised of a second a pair of the clamps 114' that are substantially similar to the previously described clamps 114 with a modified center section 116' that lacks the bolt openings 140' of the previously described clamps 114. This second portion of the center locating bracket assembly 16 uses a goggle plate 164 to which is attached to each of the center sections 116' of these clamps 114', the clamps 114' disposed in spaced apart relationship. The goggle plate 164 has a pair of either triangular or, as seen, trapezoidal shaped reliefs 166 thereon, each relief 166 located proximate one of the clamps 114'. The goggle plate 164 may have additional reliefs for weight savings purposes.

The payload attachment system 14 is a receptacle that is a generally rectangular-shaped basket 168, that has a base plate 170 to which is attached a first end plate 172 and a second end plate 174, which are connected by a pair of spaced apart side plates 176. As seen, the base plate 170 has numerous openings 178. As also seen, the end plates 172 and 174 are attached to their respective ends of the base plate 170 by passing a series of cleats 180 on the base plate 170 into receivers 182 proximate the bottom of the end plates 172 and 174. Similarly, each of the side plates 176 is also attached to the base plate 170 by passing a series of cleats 184 on the base plate 170 into receivers 186 proximate the bottom of the side plates 176. Additionally, tabs 188 on the first end of each side plates 176 are received within receivers 190 located on the first end plate 172, while an extended tab 192 is located on the opposing second end of each side plate 176 and passes through a respective receiver 194 located on the second end plate 174. As seen, each end plate 172 and 174 and each side plate 176 has a series of slots 196 and openings 198. Typically, a load L is attached to the basket 168 of the payload attachment system 14 using loop ratchet straps that are secured through the various slots 196 on the end plates 172 or 174 and/or the side plates 176, while paracord can be used to attach the load L to the basket 168 of the payload attachment system by passing the paracord through the openings 198 on the side plate and/or the base plate 170 and then tied to tabs located at opening 178. A Bulk Deployable Securement Mechanism bag can also be hard mounted to the payload attachment system 14. A pair of triangular, or as seen, trapezoidal reliefs 200 are located on each side of the first end plate 172.

In order to use the drone load release system 10, the load L is secured to the basket 168 of the payload attachment system 14 as desired. A drone D has a pair of parallel picatinny rails P to which the payload attachment system 14 and its attendant load L is secured. This is accomplished by attaching the center locating bracket assembly 16 that is secured to the payload release system 12 to each of the picatinny rails P. For each payload release system 12, each clamp 114 is attached to the picatinny rail P by positioning each clamp tooth 120 is positioned on either side of its picatinny rail P so that the jaws 124 of each clamp tooth 120 face one another. The drive screw 130 is passed through the clamp tooth opening 122 of the first clamp tooth 120, through the first spring 128, through the center section opening 118 of the center section 116, through the second spring 128, and through the helical insert 126 within the clamp tooth opening 122 of the second clamp tooth 120. The drive screw 130 is capped with the nut 136. The drive screw 130 is rotated, via its knob 132 in order to bring the clamp teeth 120 toward one another in order to clamp the picatinny rail P therebetween. The profile of the jaw 124 of each clamp tooth 120 matches the angled face of the picatinny rail for a firm grasp of the picatinny rail P by the clamp 114 which causes the center section 116 and 116' to ride against the bottom of the picatinny rail P. The springs 128 bias the clamp teeth 120 away from the picatinny rail P in order to provide a symmetrical attachment of each clamp 114 to the picatinny rail P. The second pair of clamps 114' is attached in similar fashion so that the goggle plate 164 faces the first set of clamps 114 and their attached payload release system 12 components.

Of course, other type of picatinny attachment systems can be used to secure to the picatinny rails, however, such off the shelf clamp tightens down on the picatinny rail with a single tooth on just one side (unlike the present invention's spring biased dull side tightening), the centerline width between such rail clamps remains variable. As such, the single fixed tooth on each off the shelf clamp remain at a fixed distance from one another. This restricts the possible clamp orientations and would require either a left-handed and right-handed version of the clamp, or one clamp to be oriented facing the opposite direction, resulting in the thumb screw being located between the rails.

With all four of the clamps 114 and 114' attached, the motors 18 of the payload release system 12 are electrically and communicatively coupled to the electrical system and communication system respectively of the drone D via the wiring 202 provided (actual connection not shown), in order to provide a source of electrical power for the motors 18 and control for the motors 18. Thereafter, the load bearing basket 168 of the payload attachment system 14 is attached to the drone D by passing each extended tab 192 into one of the reliefs 166 on the goggle plate 164. This attachment allows the basket 168 to pivot with respect to the goggle plate 164. Thereafter, with each drop cam 38 in the open position, the basket 168 is rotated until the first end plate 172 engages the drop cams 38. The basket 168 is positioned so that the reliefs 200 on the first end plate 172 of the basket 168 are aligned with a respective mouth 40 of the drop cam 38. The basket 168 continues to rotate toward the drop cam 38 until it engages the drop cam 38 and rotates it toward and into the closed position being held in the closed position by the spring assembly 96 with the mouth 40 of the drop cam 38 passing through the relief 200 on the first end plate 172. The basket 168 is now secured to the drone D. The drone D is now ready for delivery operation. Once the drone D travels to its intended target, it releases the load L, either while airborne or upon landing. In order to so release, a signal is sent to the motors 18 to rotate the servo cam 22. Rotation of the servo cam 22 causes its nose 160 to engage and lift the release lever 60 away from the drop cam pad 42 against the bias of the spring assembly 96, thereby rotating the drop cam 38 into its open position. When the drop cam 38 is in the open position, the drop cam 38 no longer engages the first end plate 172 allowing this side of the basket 168 to gravitationally fall free of each of the two drop assemblies. Coincidentally, the extended tabs 192 rotate within the goggle plate 164 and then gravitationally fall free therefrom, causing the basket 168 and its load L to fall free of the drone D. The drone D then travels to its next destination as desired, possibly with a new load attached. Of course, if the payload release system 12 does not operate in appropriate fashion, either fails to respond to commands, lacks electrical power, or otherwise malfunctions, a manual release of the basket 168, via upward push on the release lever 60, can be occasioned. Should there be a servo motor 18 malfunction, such that the servo motors 18 releases its portion of the basket 168 without desire, or fails to rotate, the basket 168 remains secured to the drone D via the three remaining points of contact.

The motors 18 operate based on a received signal, such as a pulsed width modulation signal, from the drone D via the signal connection. This signal can be dynamic in that either the controllers of the drone D, who may be remote of the delivery area, or personnel at the drop site can initiate the provision of the drop signal, or the drone D can be programmed so as to initiate the drop signal to the motors 18 at a predetermined location so once the drone D determines it is at the location, the drop signal is sent to the motors 18 in order to release the basket 168, in synchronous lockstep.

Alternately, the motors may be self-contained in that they have their own source of electrical power apart from the drone and their own control circuitry so that control of the motors is independent of the drone proper. In such an architecture, the two motors would need to be appropriately synced so that each motor initiates its drop operation simultaneously in order to prevent the hang-up of the basket on one of the drop assemblies, as such hang-up, even if relatively short.

Of course, the entire system can be used with a single picatinny rail on the drone by using a single payload release system, a relatively narrow payload attachment receptacle, and a single point of attachment center locating bracket assembly.

While the invention has been particularly shown and described with reference to an embodiment thereof, it will be appreciated by those skilled in the art that various changes in form and detail may be made without departing from the spirit and scope of the invention.

We claim:

1. A load carrying system for attachment to a picatinny rail of a drone in order to carry a supply load, the load carrying system comprising:
   a plate having a first relief, the plate adapted to be attached to the picatinny rail of the drone;
   a payload release system adapted to be attached to the picatinny rail of the drone in spaced apart fashion from the plate, the payload release system having a housing that has a drop cam rotatably attached thereto, the drop cam having a receiver mouth and rotatable between a normally open position wherein the receiver mouth is facing away from the picatinny rail and a closed position wherein the receiver mouth is facing generally toward the picatinny rail; and
   a receptacle having a base, a first end plate with a second relief and an opposing second end plate joined to the first end plate by a side plate having a tab, such that the tab is received within the first relief and the receiver mouth receives the second relief such that whenever the receiver mouth is in the closed position, the receptacle is secured to the picatinny rail with the first end plate of the receptacle held within the receiver mouth and the tab of the second end plate held within first relief and when the receiver mouth is in the open position, the first end plate gravitationally falls out of the receiver mouth of the payload release system and the tab gravitationally slides out of the first relief whenever the picatinny rail is facing a ground surface.

2. The load carrying system as in claim 1 wherein the receptacle is in the form of a lattice.

3. The load carrying system as in claim 1 wherein the first end plate and the second end plate of the receptacle are joined by a first side plate and an opposing second side plate.

4. The load carrying system as in claim 3 wherein the base, the first end plate, the second end plate, the first side plate and the second side plate are all in the form of a lattice.

5. The load carrying system as in claim 1 further comprising a lever rotatably attached to the housing wherein the lever is rotatable between a hold position wherein the lever biases against the drop cam whenever the drop cam is in the closed position thereby preventing the drop cam from rotating to the open position, and a release position wherein the lever is disengaged from the drop cam allowing the drop cam to rotate to the open position, the lever spring-loaded under the bias of a spring.

6. The load carrying system as in claim 5 further comprising a servo cam such that the servo cam rotates between an engaged position wherein the servo cam presses against the lever in order to hold the lever in the release position and a disengaged position wherein the lever, under the bias of the spring, rotates to the hold position.

7. The load carrying system as in claim 6 wherein the servo cam is rotated by a servo motor held within the housing.

8. The load carrying system as in claim 7 wherein the servo motor receives an operation signal to rotate the servo cam via a wireless signal.

9. The load carrying system as in claim 7 wherein the servo motor receives an operation signal to rotate the servo cam via a preprogrammed instruction set input into a control module in communication with the servo motor.

10. The load carrying system as in claim 1 wherein the plate is configured to be attached to the picatinny rail via a first variable width clamp that is adapted to engage the picatinny rail and the payload release system is configured to be attached to the picatinny rail by a second variable width clamp that is adapted to engage the picatinny rail.

11. The load carrying system as in claim 10 wherein the first variable width clamp and the second variable width clamp are each spring-loaded.

12. A load carrying system for attachment to a first picatinny rail and a parallel second picatinny rail of a drone in order to carry a supply load, the load carrying system comprising:
 a plate having a first relief and a second relief, the plate adapted to be attached to the first picatinny rail and the second picatinny rail of the drone;
 a first payload release system adapted to be attached to the first picatinny rail of the drone, in spaced apart fashion from the plate, the first payload release system having a first housing that has a first drop cam rotatably attached thereto, the first drop cam having a first receiver mouth and rotatable between a normally first open position wherein the first receiver mouth is facing away from the first picatinny rail and a first closed position wherein the first receiver mouth is facing generally toward the first picatinny rail;
 a second payload release system adapted to be attached to the second picatinny rail of the drone, in spaced apart fashion from the plate, the second payload release system having a second housing that has a second drop cam rotatably attached thereto, the second drop cam having a second receiver mouth and rotatable between a normally second open position wherein the second receiver mouth is facing away from the second picatinny rail and a second closed position wherein the second receiver mouth is facing generally toward the second picatinny rail; and
 a receptacle having a base, a first end plate with a third relief and a fourth relief and an opposing second end plate joined to the first end plate by a side plate having a first tab and a second tab such that the first tab is received within the first relief and the second tab is received within the second relief and the first receiver mouth receives the third relief and the second receiver mouth receives the fourth relief such that whenever the first receiver mouth is in the first closed position or the second receiver mouth is in the second closed position, the receptacle is secured to the first picatinny rail and to the second picatinny rail with the first end plate of the receptacle held within the first receiver mouth or within the second receiver mouth and the first tab of the second end plate held within first relief and the second tab of the second end plate is held within the second relief and when the first receiver mouth is in the first open position and the second receiver mouth is in the second open position, the first end plate gravitationally falls out of the first receiver mouth of the first payload relief system and out of the second receiver mouth of the second payload release system and the first tab gravitationally slides out of the first relief and the second tab slides out of the second relief whenever the picatinny rail is facing a ground surface.

13. The load carrying system as in claim 12 wherein the receptacle is in the form of a lattice.

14. The load carrying system as in claim 12 wherein the first end plate and the second end plate of the receptacle are joined by a first side plate and an opposing second side plate.

15. The load carrying system as in claim 14 wherein the base, the first end plate, the second end plate, the first side plate and the second side plate are all in the form of a lattice.

16. The load carrying system as in claim 12 further comprising:
 a first lever rotatably attached to the first housing wherein the first lever is rotatable between a first hold position wherein the first lever biases against the first drop cam whenever the first drop cam is in the first closed position thereby preventing the first drop cam from rotating to the first open position, and a first release position wherein the first lever is disengaged from the first drop cam allowing the first drop cam to rotate to the first open position, the first lever spring-loaded under the bias of a first spring; and
 a second lever rotatably attached to the second housing wherein the second lever is rotatable between a second hold position wherein the second lever biases against the second drop cam whenever the second drop cam is in the second closed position thereby preventing the second drop cam from rotating to the second open position, and a second release position wherein the second lever is disengaged from the second drop cam allowing the second drop cam to rotate to the second open position, the second lever spring-loaded under the bias of a second spring.

17. The load carrying system as in claim 16 further comprising:
 a first servo cam such that the first servo cam rotates between a first engaged position wherein the first servo cam presses against the first lever in order to release the first lever in the first release position and a first disengaged position wherein the first lever, under the bias of the first spring, rotates to the first hold position; and,
 a second servo cam such that the second servo cam rotates between a second engaged position wherein the second servo cam presses against the second lever in order to release the second lever in the second release position and a second disengaged position wherein the second lever, under the bias of the second spring, rotates to the second hold position.

18. The load carrying system as in claim 16 wherein the first servo cam is rotated by a servo motor held within the first housing and the second servo cam is rotated by a second motor held within the second housing.

19. The load carrying system as in claim 18 wherein the first servo motor and the second servo motor each receive an operation signal to rotate the first servo cam and the second servo cam respectively via a wireless signal, the first servo motor and the second servo motor operating in lockstep.

20. The load carrying system as in claim 18 wherein the first servo motor and the second servo motor each receive an operation signal to rotate the first servo cam and a second via a preprogrammed instruction set input into a control module in communication with the first servo motor and the second servo motor, the first servo motor and the second servo motor operating in lockstep.

21. The load carrying system as in claim 12 wherein the plate is configured to be attached to the first picatinny rail via a first variable width clamp that is adapted to engage the first picatinny rail and is attached to the second picatinny rail via a second variable width clamp that is adapted to engage the second picatinny rail and the first payload release system is configured to be attached to the first picatinny rail by a third variable width clamp that is adapted to engage the first picatinny rail and the second payload release system is configured to be attached to the second picatinny rail by a fourth variable width clamp that is adapted to engage the second picatinny rail.

22. The load carrying system as in claim 21 wherein the first variable width clamp, the second variable width clamp, the third variable width clamp and the fourth variable width clamp are each spring-loaded.

\* \* \* \* \*